(12) United States Patent
Ishizaki

(10) Patent No.: US 6,846,337 B2
(45) Date of Patent: Jan. 25, 2005

(54) SECONDARY BATTERY, ANODE CAN THEREOF, AND METHOD OF MANUFACTURING THE SAME

(75) Inventor: Morio Ishizaki, Itami (JP)

(73) Assignee: Ishizaki Press Kogyo Co., Ltd., Hyogo (JP)

(*) Notice: Subject to any disclaimer, the term of this patent is extended or adjusted under 35 U.S.C. 154(b) by 320 days.

(21) Appl. No.: 10/162,595

(22) Filed: Jun. 6, 2002

(65) Prior Publication Data
US 2002/0187392 A1 Dec. 12, 2002

(30) Foreign Application Priority Data

Jun. 8, 2001 (JP) ........................ 2001-174639
Jun. 26, 2001 (JP) ........................ 2001-192916

(51) Int. Cl.⁷ .................. H01M 6/00; H01M 2/04; B21K 27/06; B21D 11/10
(52) U.S. Cl. .................. 29/623.1; 429/176; 72/324; 72/379.4
(58) Field of Search .................. 429/176; 29/623.1; 72/324, 379.2, 379.4

(56) References Cited

FOREIGN PATENT DOCUMENTS

| EP | 63102158 | 5/1988 |
|---|---|---|
| EP | 11144690 | 5/1999 |
| JP | 7-18346 | 3/1995 |
| JP | 11-102728 | 4/1999 |
| JP | 2000-40496 | 2/2000 |
| JP | 2001-243930 | * 9/2001 |

\* cited by examiner

Primary Examiner—Patrick Ryan
Assistant Examiner—Thomas H. Parsons
(74) Attorney, Agent, or Firm—McDermott Will & Emery LLP

(57) ABSTRACT

An anode can capable of preventing leakage of liquid, method of fabricating the same, and battery using the anode can and method of fabricating the same is provided. An anode can is formed of a material formed of a stack of layers including an aluminum alloy and stainless steel layers formed on the aluminum alloy layer and it includes a flat, center portion and a peripheral side wall contiguous to and surrounding the flat center portion. The aluminum alloy layer located at the peripheral side wall is thinner than the aluminum alloy layer located at the flat center portion. At an edge of the peripheral side wall, the aluminum alloy and stainless steel layers have their respective end surfaces aligned substantially in a single straight line in a plane substantially perpendicular to an outer peripheral surface of the peripheral side wall.

4 Claims, 17 Drawing Sheets

SECONDARY BATTERY, ANODE CAN THEREOF, AND METHOD OF MANUFACTURING THE SAME

BACKGROUND OF THE INVENTION

1. Field of the Invention

The present invention relates generally to secondary batteries miniaturized for example in forms of buttons, coins and the like and used as a main power source for electronics, a power source for backing up memory and the like, an anode or negative electrode cans thereof, and methods of manufacturing the same, and more specifically to anode cans of secondary batteries obtained by bending a material formed of layers stacked to combine materials different in hardness, secondary batteries using the anode can, and methods of manufacturing the same.

2. Description of the Background Art

FIG. 25 is a schematic partial cross section of a conventional battery. With reference to the figure the conventional battery will be described.

The FIG. 25 battery is a so-called manganese (Mn)-lithium (Li) secondary battery and it includes a cathode or positive electrode can 101 also serving as a cathode terminal, an anode or negative electrode can 102 connected to cathode can 101 via a gasket 106 and also serving as an anode terminal, and a cathode 107, a separator 109 and a lithium metal 108 accommodated in a space formed by cathode and anode cans 101 and 102. Cathode can 101 is formed by shaping a stainless steel plate highly resistant to corrosion. Anode can 102 is formed by shaping a material including a stainless steel layer 102a formed of the same stainless steel that forms cathode can 101, and a hard aluminum alloy layer 102b arranged on an inner circumference of stainless steel layer 102a. Note that the FIG. 25 battery has a structure in symmetry relative to a centerline 111.

Anode can 102 has a periphery provided with a shoulder 103 lower by one step than an upper surface of anode can 102. At the outer portion of the shoulder 103 the periphery is angled 104. From angled portion 104 a peripheral wall 105 extends in a downward direction substantially vertically. Anode can 102 thus includes shoulder 103, angled portion 104 and peripheral wall 105.

Between cathode can 101 and anode can 102 there is arranged cathode 107 on cathode can 101. Cathode 107 is covered by separator 109. On separator 109, lithium metal 108 forming an anode is arranged in contact with hard aluminum alloy layer 102b of anode can 102. Cathode 107, separator 109, lithium metal 108 and an electrolyte configure a power generation cell.

A gasket 106 electrically insulates cathode can 101 and anode can 102 and also closely seals cathode 107, separator 109 and lithium metal 108 in a casing formed by cathode and anode cans 101 and 102. Gasket 106 is arranged between an internal surface of an erected portion 101a of a periphery of cathode can 101 and an outer peripheral surface of anode can 102 extending from shoulder 103 to peripheral wall 105 and erected portion 101a is then folded to seal the battery.

The present inventor studied the FIG. 25 conventional battery and has found that it has disadvantages, as described hereinafter.

More specifically, in the FIG. 25 battery, anode can 102 is pressed to form shoulder 103, angled portion 104, peripheral wall 105 and the like. Anode can 102, however, is formed of a material formed by a stack of layers including stainless steel layer 102a and hard aluminum alloy layer 102b, i.e., a clad material. As such, when the material is pressed, as described above, its peripheral wall having been pressed has an end, as shown in FIG. 26. More specifically, layer 102b, arranged inside layer 102a, has an end 126 protruding relative to an end surface 116 of layer 102a (or layer 102b has an end surface 117 in a region protruding relative to end surface 116 of layer 102a). FIG. 26 is a schematic diagram for illustrating a disadvantage of the FIG. 25 battery. Furthermore, as can be understood from FIG. 26, end 126 is formed as layer 102b being pressed, as described above, is plastically deformed, extruded from an end of the layer. End 126 thus has a geometry having a gently curving surface, as shown in FIG. 26.

Furthermore, in some case, anode can 102 is angled 104 by pressing it at peripheral wall 105 vertically using a die and a punch. This results in peripheral wall 105 having an end such that hard aluminum alloy layer 102b has an end 127 covering an end surface of stainless steel layer 102a, as shown in FIG. 27. FIG. 27 is another schematic diagram for illustrating a disadvantage of the FIG. 25 battery.

When hard aluminum alloy layer 102b has end 126 protruding and having a curving surface, as shown in FIG. 26, or it has end 127 covering an end surface of stainless steel layer 102a, as shown in FIG. 27, there is a case in which anode can 102 cannot have peripheral wall 105 firmly fixed to gasket 106 (or peripheral wall 105 cannot have an end plunged into and fixed in gasket 106) when the battery is sealed. As a result, gasket 106 and anode can 102 bonded together provide poor hermeticity and the battery thus has poor characteristics, a reduced lifetime (or charging and discharging cycle lifetime), and other similar disadvantages.

SUMMARY OF THE INVENTION

The present invention contemplates a secondary battery free of poor characteristics and also extended in lifetime, an anode can thereof, and a method of manufacturing the same.

In accordance with the present invention in one aspect an anode can of a secondary battery is formed of a material formed of a stack of layers including an aluminum alloy layer and a stainless steel layer formed on the aluminum alloy layer and it includes a flat, center portion and a peripheral side wall contiguous to and surrounding the flat center portion. The aluminum alloy layer located at the peripheral side wall is smaller in thickness than the aluminum alloy layer located at the flat center portion. The peripheral side wall has an edge with the aluminum alloy layer and the stainless steel layer having their respective end surfaces aligned substantially in a single straight line in a plane substantially perpendicular to an outer peripheral surface of the peripheral side wall.

Thus the peripheral side wall has an edge without the aluminum alloy layer protruding relative to the stainless steel layer. This ensures that the aluminum alloy layer is free of a protrusion otherwise contributing to the anode can and the gasket or any other similar member being insufficiently bonded together. Consequently, the anode can and the gasket or any other similar member can be bonded together more closely and thus provide enhanced hermeticity.

Furthermore when the stainless steel layer at the flat center portion and that at the peripheral side wall are substantially uniform in thickness, the peripheral side wall can be smaller in total thickness than the flat center portion. As such, when this anode can is used to fabricate a battery, the anode can's peripheral side wall can readily be plunged into a gasket or any other similar member used to connect and seal a cathode can and the anode can. This ensures that the anode can is firmly fixed to the gasket or any other similar member. Thus in the battery using the anode can the anode can and the gasket can be bonded together to provide enhanced hermeticity to prevent the battery's electrolyte or the like from leaking from the bonded portion thus preventing the battery from having poor characteristics and reduced lifetime.

In accordance with the present invention in another aspect an anode can of a secondary battery is formed of a material formed of a stack of layers including an aluminum alloy layer and a stainless steel layer formed on the aluminum alloy layer and it includes a flat, center portion and a peripheral side wall contiguous to and surrounding the flat center portion. The peripheral side wall has an edge with the stainless steel layer having an end surface in a region protruding relative to an end surface of the aluminum alloy layer in a direction substantially parallel to an outer peripheral surface of the peripheral side wall.

Thus the peripheral side wall has an edge with the stainless steel layer having an end protruding relative to that of the aluminum alloy layer. This ensures that if the anode can of the present invention is applied for example to an organic electrolyte secondary battery a gasket or any other similar member and the peripheral side wall can firmly be bonded together as the stainless steel layer has an end surface in close contact with the gasket or any other similar member. The anode can and the gasket or any other similar member can thus be bonded together more closely to provide enhanced hermeticity. This can prevent the battery's electrolyte or the like from leaking from the bonded portion and thus prevent the battery for example from having poor characteristics and reduced lifetime.

In the above one or another aspect preferably the peripheral side wall has the aluminum alloy layer tapering toward the edge of the peripheral side wall.

The anode can thus have a peripheral side wall sharpened in geometry, tapering toward an edge thereof. The peripheral side wall can thus readily be plunged into a gasket or any other similar member. Consequently, the gasket or any other similar member and the peripheral side wall can be bonded together to provide further enhanced hermeticity.

In accordance with the present invention in still another aspect a secondary battery includes the anode can provided in the above one or another aspect.

The battery can thus be free from leakage of liquid from a portion at which the anode can and the gasket are bonded together.

In accordance with the present invention in still another aspect a method of fabricating an anode can of a secondary battery includes the steps of: (a) preparing a material formed of a stack of layers including an aluminum alloy layer and a stainless steel layer formed on the aluminum alloy layer, the material being cut to match in size an anode can to be obtained; (b) reducing the aluminum alloy layer in thickness at a periphery of the material; (c) after step (b), cutting an edge of the periphery of the material to allow the aluminum alloy layer and the stainless steel layer to have their respective side surfaces substantially in a single plane; and (d) after step (c), bending and thus erecting the periphery of the material in a direction.

With the cutting step, the material formed of a stack of layers can have a periphery with the aluminum alloy layer and the stainless steel layer having their respective side surfaces in alignment (or the layers' respective side surfaces can form a single, continuous plane). After the side surfaces are aligned, the material's periphery is bent and thus erected. The peripheral aluminum alloy layer has a reduced thickness, which can prevent a material of the aluminum alloy layer from plastically flowing to the periphery from a center of the material formed of the stack of layers when the periphery is bent and erected. The periphery can thus have an end without the aluminum alloy layer having a side surface protruding relative to that of the stainless steel layer. As such, a battery with the anode can fabricated in the present method can be free from leakage of liquid and the aluminum alloy layer can be free of a protrusion that otherwise contributes to the anode can and the gasket, or any other similar member, being insufficiently bonded together.

Preferably the method further includes before step (c) and after step (d) the step of re-processing the aluminum alloy layer at the periphery of the material to prevent the aluminum alloy layer from having an end extending over the side surface of the stainless steel layer in step (d).

This can prevent the aluminum alloy layer from having an edge protruding relative to a side surface of the stainless steel layer when the material's periphery is bent and erected in a direction.

Preferably the step of re-processing includes the step of reducing the aluminum alloy layer in thickness at the periphery of the material.

Furthermore the method may further include after step (d) the step of causing the aluminum alloy layer to recede from the stainless steel layer at an end surface of the periphery of the material.

This ensures that the material's periphery has an end surface with the stainless steel layer protruding relative to the aluminum alloy layer. As such when the anode can fabricated in the present method is applied to a battery the anode can's end can contribute to enhanced hermetically.

In accordance with the present invention in still another aspect a method of fabricating a secondary battery uses the method of fabricating the anode can in the above still another aspect.

This can provide a battery free of liquid leaking from a portion at which the anode can and a gasket are bonded together.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
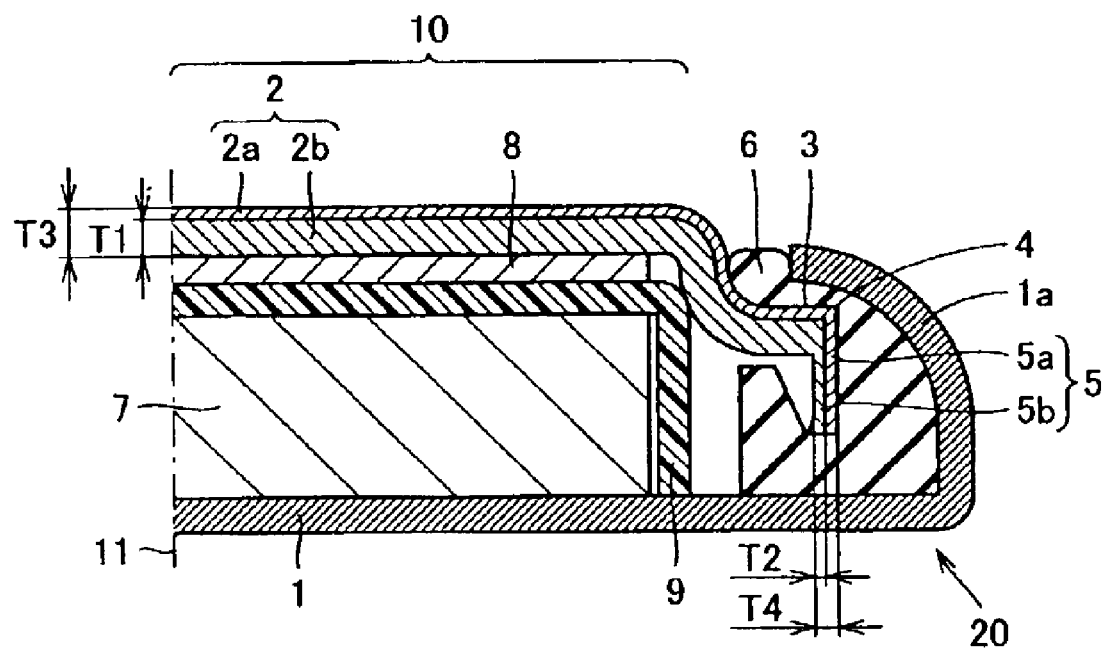
FIG. 1 is a schematic partial cross section of a first embodiment of a battery of the present invention.

Hereinafter with reference to the drawings the present invention will be described in embodiments. Note that in the figures, like components are denoted by like reference characters.

First Embodiment

With reference to FIG. 1, a battery will be described.

The FIG. 1 battery 20 is a manganese (Mn)-lithium (Li) secondary battery, a so-called organic electrolyte secondary battery, and it includes a cathode or positive electrode can 1 also serving as a cathode terminal, an anode or negative electrode can 2 connected to cathode can 1 via a gasket 6 and also serving as an anode terminal, and a cathode 7, a separator 9 and a lithium metal 8 accommodated in a space formed by cathode and anode cans 1 and 2. Cathode can 1 is formed by shaping a stainless steel plate highly resistant to corrosion. Battery 20 may for example be a manganese dioxide-lithium secondary battery. Anode can 2 is formed by shaping a material including a stainless steel layer 2a formed of the same stainless steel that forms cathode can 1, and a hard aluminum alloy layer 2b arranged on an inner circumference of stainless steel layer 2a. Anode can 2 at a terminal portion 10 has a total thickness T3 of approximately 0.3 mm, hard aluminum alloy layer 2b having a thickness T1 of approximately 0.2 mm and stainless steel layer 2a having a thickness of approximately 0.1 mm. Hard aluminum alloy layer 2b contains 5% by mass of manganese (Mn). Hard aluminum alloy layer 2b may be replaced with hard aluminum.

Anode can 2 is peripherally provided with a shoulder 3 lower by one step than an upper surface of anode can 2. Outside shoulder 3 there is an angled portion 4 bent by a predetermined angle (for example of 90 degrees±10 degrees), as seen from shoulder 3. From angled portion 4 a peripheral wall 5 extends in a downward direction substantially vertically. Anode can 2 is formed to extend from a flat center portion or terminal portion 10 through shoulder 3 and angled portion 4 to peripheral wall 5.

As can be seen in FIG. 1, thickness T1 of layer 2b located at terminal portion 10 is larger than thickness T2 of a peripheral wall 5b of the hard aluminum alloy layer located at peripheral wall 5. Thus, thickness T4 of peripheral wall 5 is smaller than thickness T3 of anode can 2 of the terminal portion 10. Furthermore, peripheral wall 5 has an end provided with a protrusion 23 (FIG. 8) raised (or increased in thickness) at peripheral wall 5b inwards.

Cathode can 1 and anode can 2 together form a space, in which cathode 7 is arranged, overlaying cathode can 1. Cathode 7 is covered by separator 9. On separator 9, lithium metal 8 forming an anode is arranged in contact with hard aluminum alloy layer 2b of anode can 2. Cathode 7, separator 9, lithium metal 8 and an electrolyte configure a power generation cell.

A gasket 6 electrically insulates cathode can 1 and anode can 2 and also serves as a member hermetically sealing cathode 7, separator 9, lithium metal 8 and an electrolyte in a casing formed by cathode and anode cans 1 and 2. Gasket 6 is arranged between an internal surface of an erected portion 1a of a periphery of cathode can 1 and an outer peripheral surface of anode can 2 extending from shoulder 3 to peripheral wall 5 and erected portion 1a is then folded to seal the battery. It should be noted that anode can 2 has peripheral wall 5 plunged into gasket 6. Note that the FIG. 1 battery has a structure in symmetry relative to a centerline 11 and it has a diameter for example of approximately 4 mm.

Thus, for anode can 2 of battery 20, thickness T2 of peripheral wall 5b of the layer at peripheral wall 5 serving as a peripheral side wall is smaller than thickness T1 of hard aluminum alloy layer 2b at terminal portion 10 serving as a flat center portion. Furthermore, the hard aluminum alloy layer's peripheral wall 5b and the stainless steel layer's peripheral wall 5a have their respective end side surfaces substantially in a single plane. This can help to plunge peripheral wall 5 of anode can 2 into gasket 6 and thus ensures that peripheral wall 5 can firmly be fixed to gasket 6. Battery 20 can thus be prevented from having gasket 6 and anode can 2 bonded insufficiently and thus providing poor hermeticity resulting in the battery having poor characteristics. Furthermore, the battery can also be free from leakage of its internal electrolyte from the portion at which anode can 2 and gasket 6 are bonded together.

Furthermore anode can 2 has peripheral wall 5 with the mechanically relatively strong stainless steel layer providing peripheral wall 5a substantially equal in thickness to stainless steel layer 2a of terminal portion 10 to allow peripheral wall 5 to have a level of mechanical strength maintained by peripheral wall 5a to some extent.

Reference will now be made to FIGS. 2–8 to describe a method of manufacturing the anode can of the present invention shown in FIG. 1.

Figure 2:
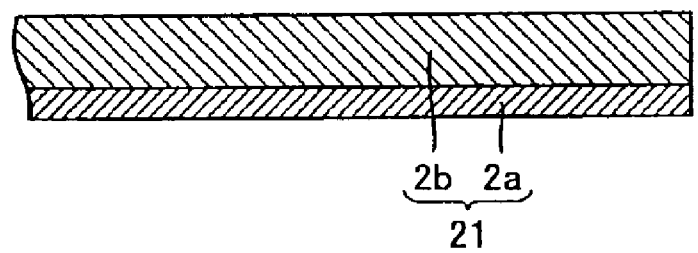
FIGS. 2–8 are schematic cross sections for illustrating first to seventh steps, respectively, of a method of manufacturing an anode can used in the FIG. 1 battery.

Initially, as shown in FIG. 2, there is prepared a clad material 21 formed of stainless steel layer 2a and hard aluminum alloy layer 2b stacked thereon. Clad material 21 is cut to have a predetermined size and geometry in accordance with the size of the anode can.

Figure 3:
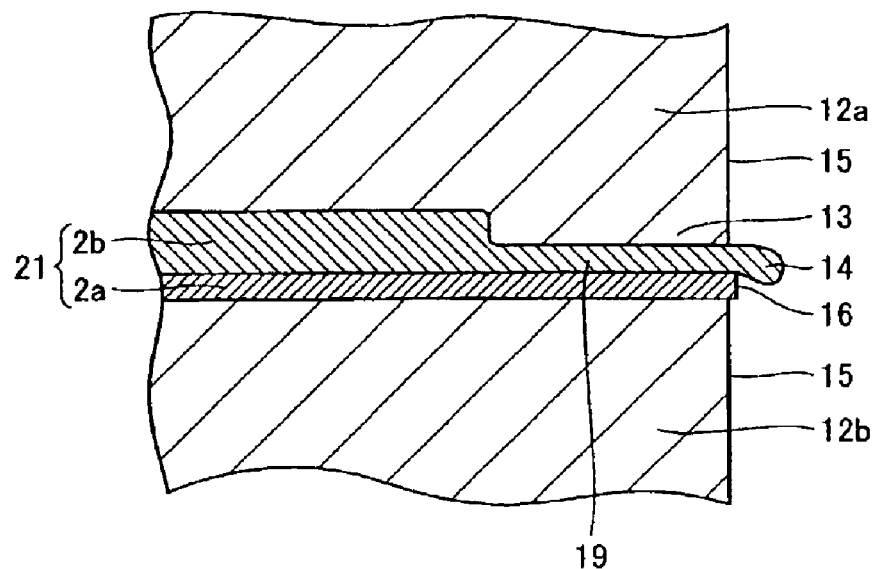

Then, as shown in FIG. 3, clad material 21 is pressed by a punch 12a and a die 12b. Punch 12a has a protrusion 13 at a portion abutting against a periphery of clad material 21. Clad material 21 thus has a periphery pressed, as shown in FIG. 3, to have hard aluminum alloy layer 2b reduced in thickness. This provides a thin portion 19 and the hard aluminum alloy thus partially, plastically flows toward an end of thin portion 19, resulting in an extruded portion 14 protruding from a side surface 15 of punch 12a and die 12b. Stainless steel layer 2a also has end 16 protruding from side surface 15.

Figure 4:
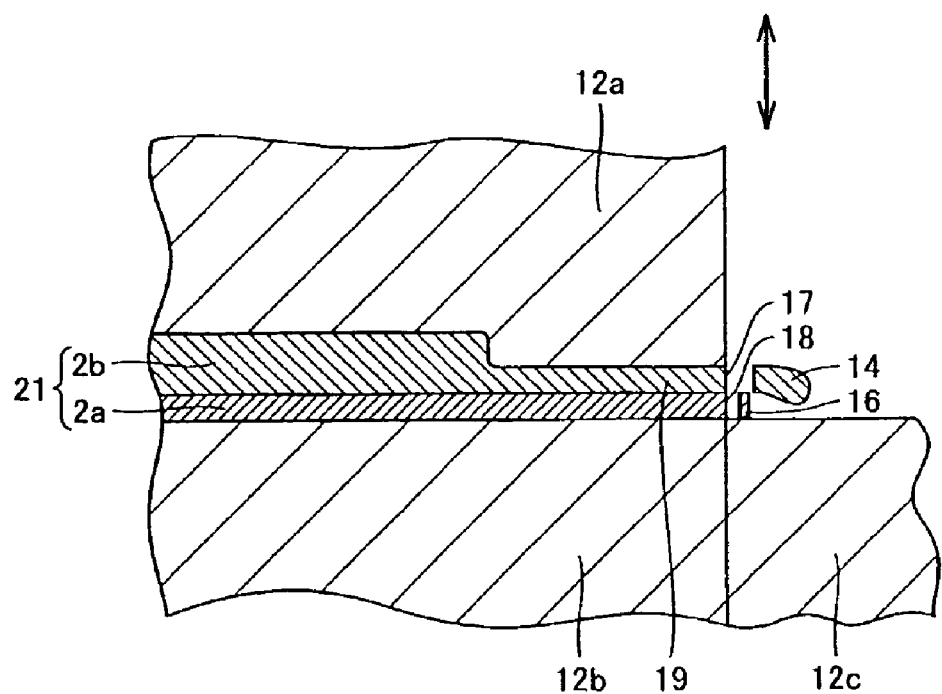

Then, as shown in FIG. 4, clad material 21 and punch 12a are moved relative to a die 12c in a direction indicated by an arrow to cut and separate extruded portion 14 of layer 2b and end 16 of layer 2a from clad material 21. As a result, layers 2b and 2a have their respective side surfaces 17 and 18 substantially in a single plane.

Figure 5:
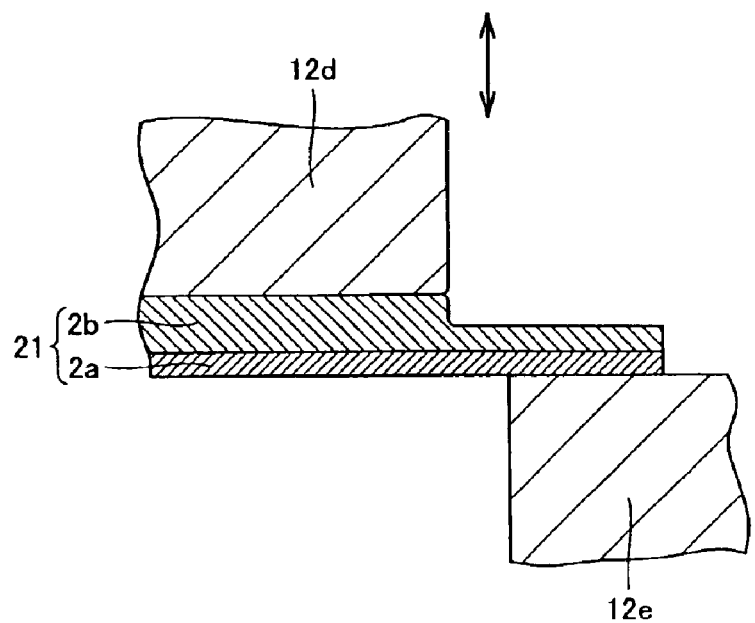
Figure 6:
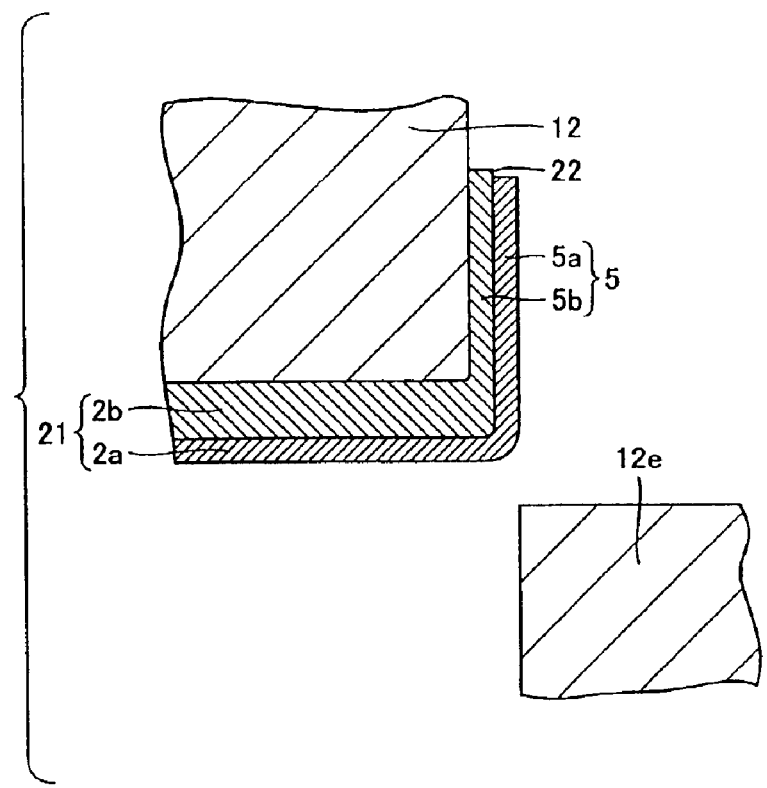

Then, as shown in FIGS. 5 and 6, a punch 12d and a die 12e are used to press clad material 21 to bend and thus erect a periphery thereof upward as seen in the figure. More specifically, clad material 21 and punch 12d are moved relative to die 12e in a direction indicated by an arrow shown in FIG. 5 to bend a periphery of clad material 21, as shown in FIG. 6. As a result, thin portion 19 formed in the FIG. 3 step is bent and thus erected and peripheral wall 5 is thus formed. Peripheral wall 5 includes the stainless steel layer's peripheral wall 5a and the hard aluminum arrow layer's peripheral wall 5b. Since peripheral wall 5b corresponds to thin portion 19 (FIG. 3), a pressed portion, peripheral wall 5b is smaller in thickness than layer 2b located at terminal portion 10. Pressing thin portion 19, as shown in FIGS. 5 and 6, and thus bending and thus erecting the same forms a protrusion 22 at an end of peripheral wall 5b located at an inner circumference of peripheral wall 5. Protrusion 22 slightly protrudes relative to an end surface of peripheral wall 5a. However, thin portion 19 with peripheral wall 5b smaller in thickness than layer 2b located at terminal portion 10 can reduce a material flowing to peripheral wall 5b. Thus protrusion 22 only protrudes in a significantly small amount.

Figure 7:
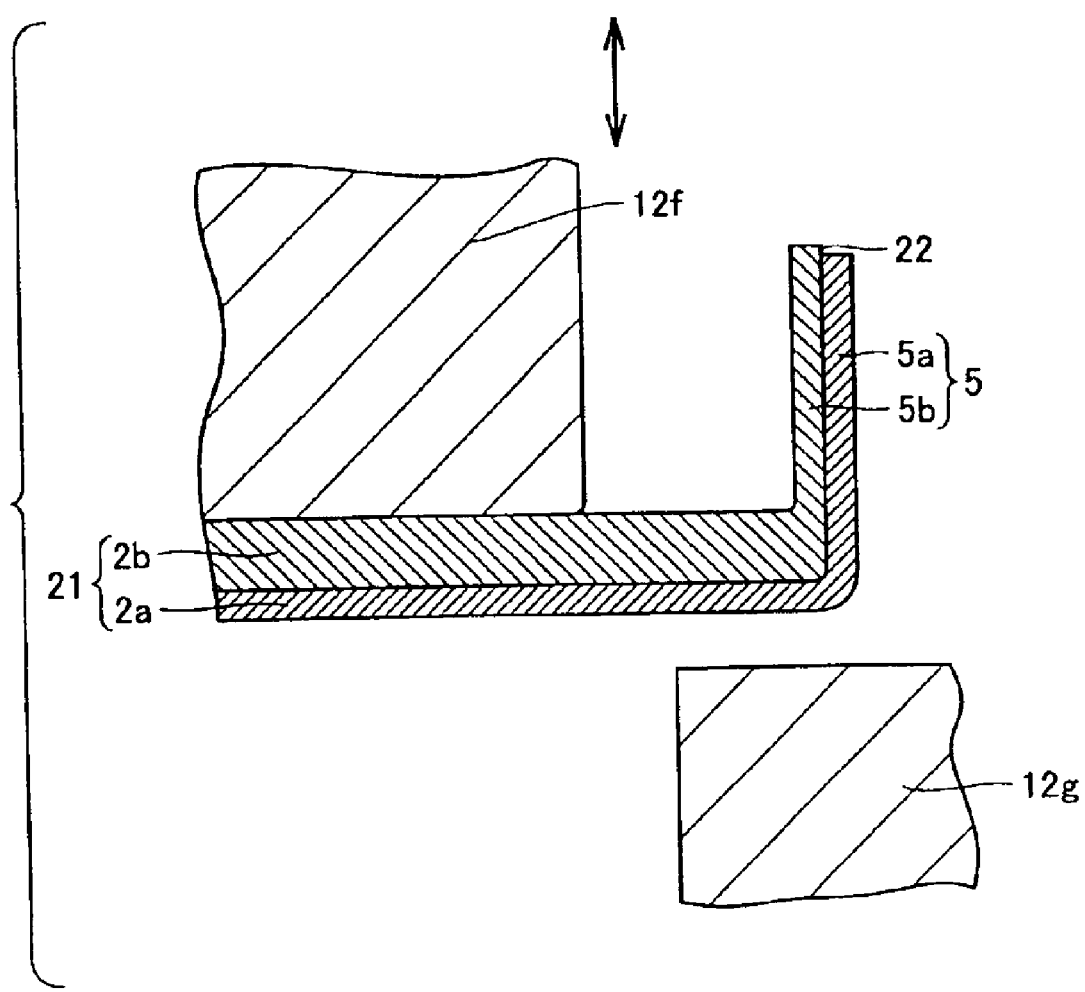
Figure 8:
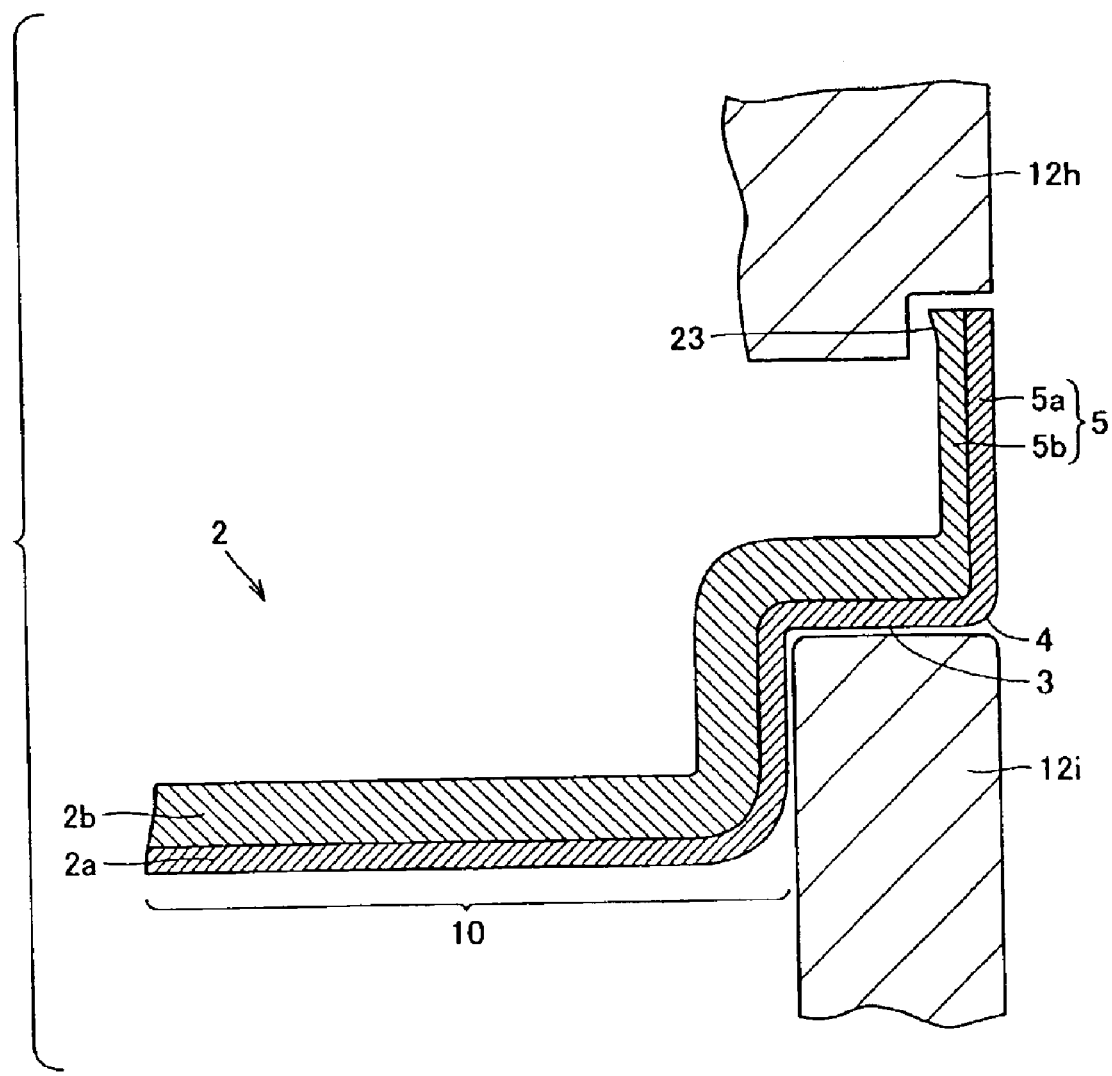

Then, as shown in FIG. 7, a punch 12f and a die 12g are used to press clad material 21 to form anode can 2 with terminal portion 10 peripherally provided with shoulder 3 and angled portion 4, as shown in FIG. 8. More specifically, with reference to FIG. 7, clad material 21 and punch 12f are moved relative to die 12g in a direction indicated by an arrow shown in the figure to push a periphery of clad material 21 upward as seen in the figure. Shoulder 3 (FIG. 8) is thus formed.

At a periphery of clad material 21 bent and erected in the FIG. 7 step, hard aluminum alloy layer 2b has a smaller thickness. This can prevent a material forming layer 2b from plastically flowing from a center portion of clad material 21 into the periphery thereof in the FIG. 7 step. The periphery can thus be free of an end with hard aluminum alloy layer 5b having side surface 17 significantly protruding relative to side surface 16 of stainless steel layer 2a.

Then, as shown in FIG. 8, punches 12h and 12i are used to press clad material 21 to deform and thus extend protrusion 22 (FIG. 7) inward. More specifically, punches 12h and 12i are moved in the same direction that peripheral wall 5 extends (to press peripheral wall 5) to cause punches 12h and 12i to crush protrusion 22. Punches 12h and 12i each have a geometry as determined to be able to deform protrusion 22 inwards. As a result, as shown in FIG. 8, the hard aluminum alloy layer's peripheral wall 5b and the stainless steel layer's peripheral wall 5a can have their respective end surfaces substantially matching in position (or substantially in a single plane). Peripheral wall 5b has an end provided with protrusion 23 protruding (or raised) inwards. This can facilitate plunging peripheral wall 5 into gasket 6 and also prevent peripheral wall 5b from having an end covering an end of peripheral wall 5a. Consequently, anode can 2 and gasket 6 can be bonded together to provide significantly enhanced hermeticity.

Furthermore the FIG. 8 step also allows angled portion 4 to have a tip sharper in geometry.

Anode can 2 thus manufactured and the FIG. 1 cathode can 1, cathode 7, separator 9, lithium metal 8 and the like can be used to fabricate the FIG. 1 battery.

Second Embodiment

Figure 9:
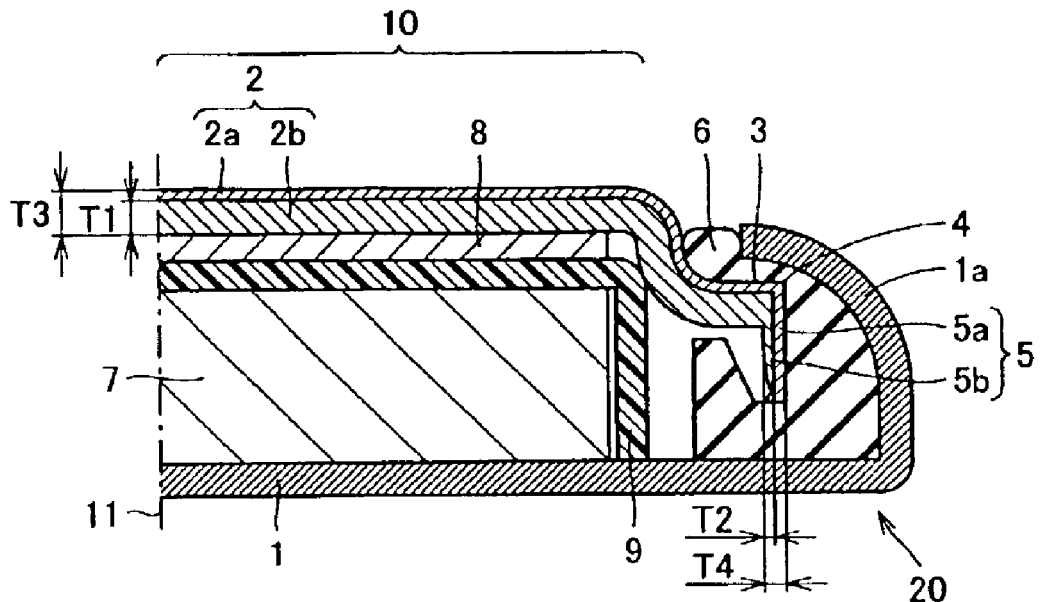
FIG. 9 is a schematic partial cross section of a second embodiment of the battery of the present invention.

The FIG. 9 battery 20 is a manganese (Mn)-lithium (Li) secondary battery, one of so-called organic electrolyte secondary batteries. It is basically similar in structure to the FIG. 1 battery, except for the geometry of peripheral wall 5 of anode can 2. More specifically, for the FIG. 9 battery 20, anode can 2 has peripheral wall 5 with the hard aluminum alloy layer providing peripheral wall 5b reduced in thickness as it approaches an end of peripheral wall 5 (i.e., peripheral wall 5b tapers). As well as in the FIG. 1 battery, peripheral wall 5 has an end with peripheral wall 5b having an end provided with protrusion 23 (see FIG. 15).

The battery of the present embodiment can thus be as effective as the FIG. 1 battery and furthermore anode can 2 having peripheral wall 5 tapering (or sharpened) toward an end thereof ensures that anode can 2 is plunged into gasket 6 more reliably. Anode can 2 and gasket 6 can thus be bonded together more closely and thus provide enhanced hermeticity.

Reference will now be made to FIGS. 10–15 to describe a method of manufacturing the anode can of the present invention shown in FIG. 9.

Initially, as described in the first embodiment with reference to the FIG. 2 step, there is prepared a clad material 21 formed of stainless steel layer 2a and hard aluminum alloy layer 2b stacked thereon (see FIG. 2). Clad material 21 is previously cut to have a predetermined size and geometry to match the size of the anode can.

Figure 10:
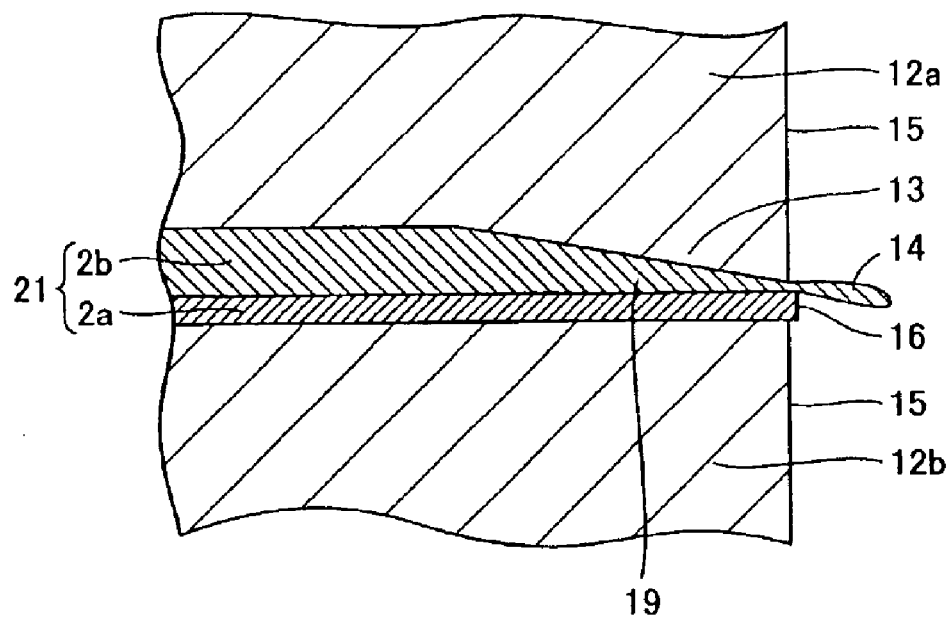
FIGS. 10–15 are schematic cross sections for illustrating first to sixth steps, respectively, of a method of manufacturing an anode can used in the FIG. 9 battery.

Then, as shown in FIG. 10, punch 12a and die 12b are used to press clad material 21. Punch 12a is provided with protrusion 13 at a portion abutting against a periphery of clad material 21. A surface of protrusion 13 that abuts against clad material 21 tapers relative to a surface of clad material 21. Clad material 21 thus has a periphery pressed, as shown in FIG. 3, to taper hard aluminum alloy layer 2b toward an end of clad material 21. A tapering thin portion 19 is thus formed.

Furthermore, the formation of tapering thin portion 19 causes the hard aluminum alloy to partially, plastically flow toward an end of thin portion 19. As a result, extruded portion 14 results. Extruded portion 14 protrudes relative to side surface 15 of punch 12a and die 12b. Furthermore, stainless steel layer 2a also has end 16 protruding relative to side surface 15.

Figure 11:
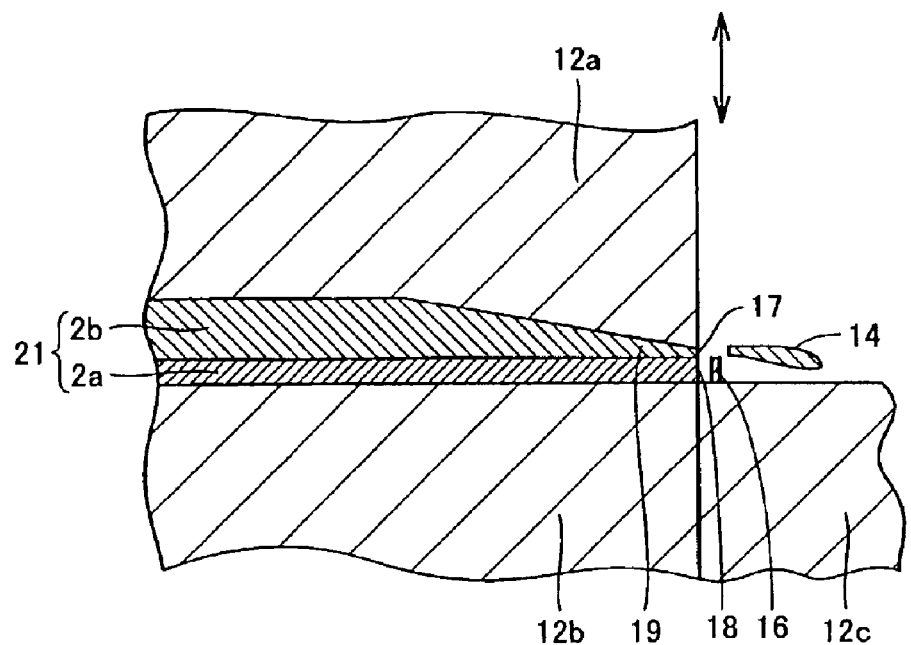

Then, as shown in FIG. 11, clad material 21 and punch 12a are moved relative to a die 12c in a direction indicated by an arrow to cut and separate extruded portion 14 of layer 2b and end 16 of layer 2a from clad material 21. As a result, layers 2b and 2a have their respective side surfaces 17 and 18 substantially in a single plane.

Figure 12:
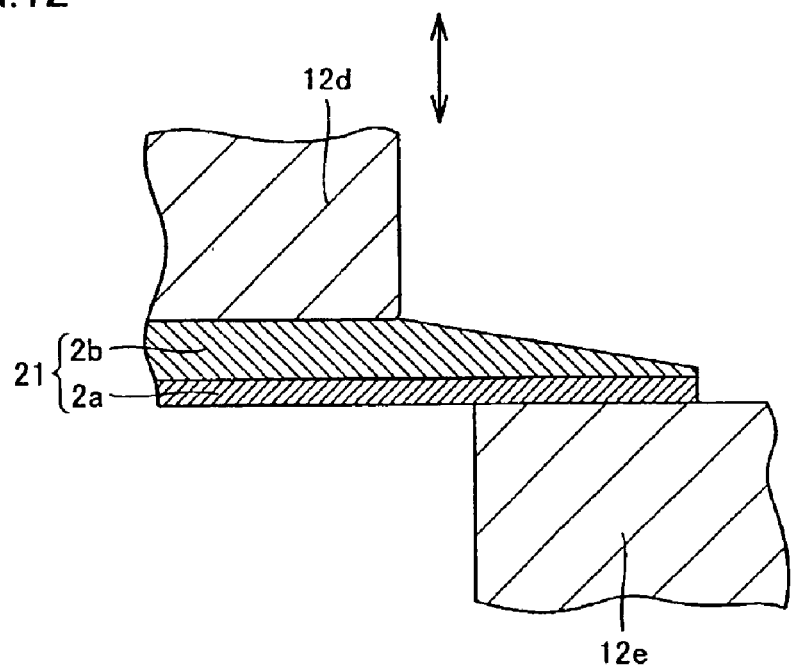
Figure 13:
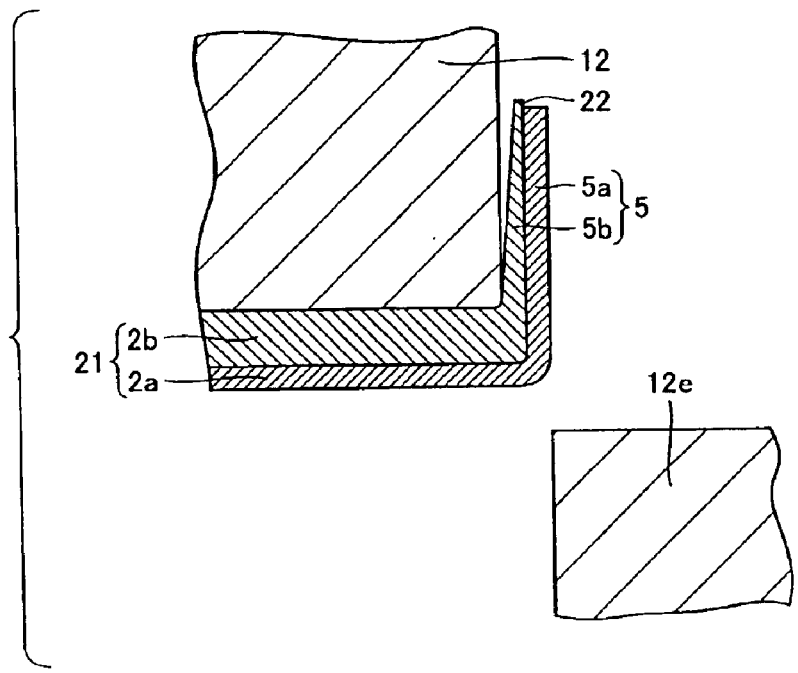

Then, as shown in FIGS. 12 and 13, a punch 12d and a die 12e are used to press clad material 21 to bend and thus erect a periphery thereof upward as seen in the figure. More specifically, as well as in the FIGS. 5 and 6 steps, clad material 21 and punch 12d are moved relative to die 12e in a direction indicated by an arrow shown in FIG. 12 to bend a periphery of clad material 21, as shown in FIG. 13. As a result, thin portion 19 formed in the FIG. 3 step is bent and thus erected and peripheral wall 5 is thus formed. Peripheral wall 5 includes the stainless steel layer's peripheral wall 5a and the hard aluminum arrow layer's peripheral wall 5b. Since peripheral wall 5b corresponds to thin portion 19 (FIG. 10), a pressed portion, peripheral wall 5b tapers toward an end of peripheral wall 5. Pressing thin portion 19, as shown in FIGS. 12 and 13, and thus bending and thus erecting the same forms a protrusion 22 at an end of peripheral wall 5b located at an inner circumference of peripheral wall 5. Protrusion 22 slightly protrudes relative to an end surface of peripheral wall 5a. However, thin portion 19 with peripheral wall 5b smaller in thickness than layer 2b located at terminal portion 10 can reduce a material flowing to peripheral wall 5b. Thus protrusion 22 only protrudes in a significantly small amount.

Figure 14:
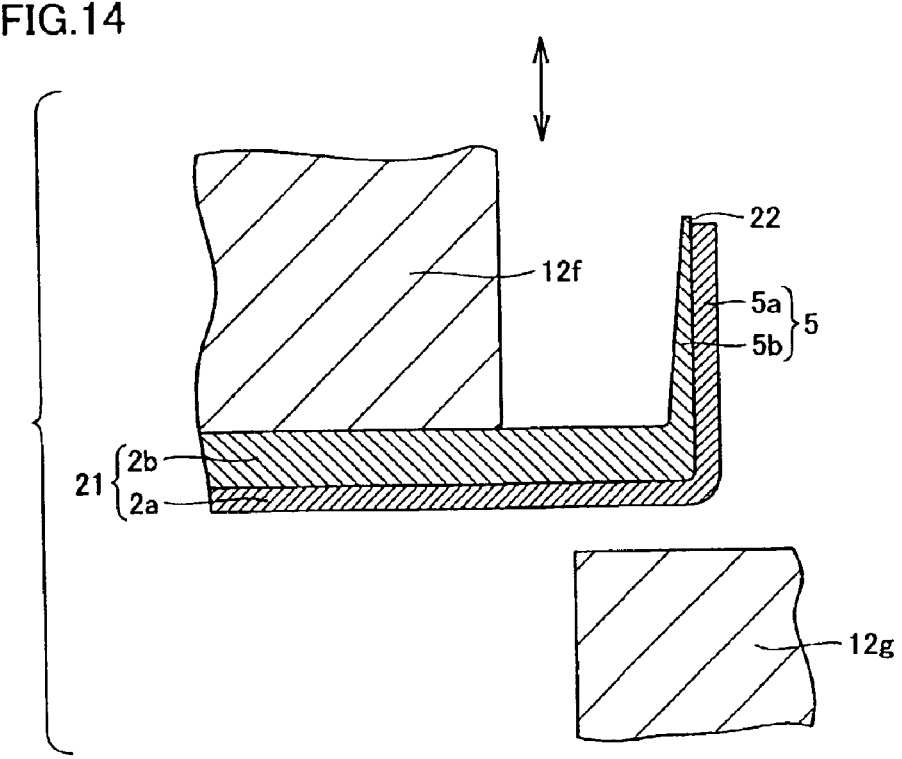
Figure 15:
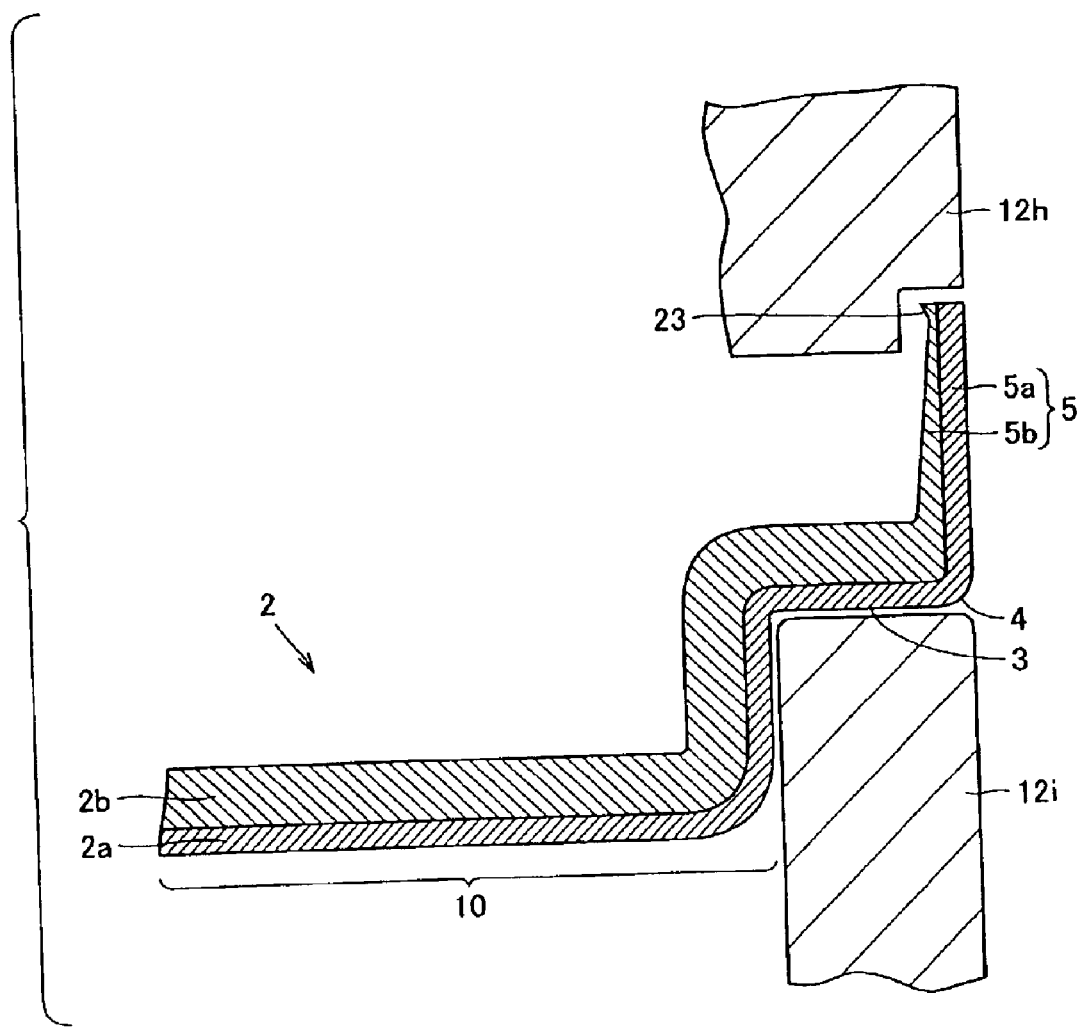

Then, as shown in FIG. 14, a punch 12f and a die 12g are used to press clad material 21 to form anode can 2 with terminal portion 10 peripherally provided with shoulder 3 and angled portion 4, as shown in FIG. 15. More specifically, with reference to FIG. 14, clad material 21 and punch 12f are moved relative to die 12g in a direction indicated by an arrow shown in the figure to push a periphery of clad material 21 upward as seen in the figure. Shoulder 3 (FIG. 15) is thus formed.

At a periphery of clad material 21 bent and erected in the FIG. 14 step, hard aluminum alloy layer 2b has a smaller thickness. This can prevent a material forming layer 2b from plastically flowing from a center portion of clad material 21 into the periphery thereof in the FIG. 14 step. The periphery can thus be free of an end with hard aluminum alloy layer 5b having side surface 17 significantly protruding relative to side surface 16 of stainless steel layer 2a.

Then, as shown in FIG. 15, punches 12h and 12i are used to press clad material 21 to deform and thus extend protrusion 22 inward. More specifically, punches 12h and 12i are moved in the same direction that peripheral wall 5 extends, so that punches 12h and 12i crush protrusion 22. Punches 12h and 12i each have a geometry as determined to be able to deform protrusion 22 inwards. As a result, as shown in FIG. 15, the hard aluminum alloy layer's peripheral wall 5b and the stainless steel layer's peripheral wall 5a can have their respective end surfaces substantially matching in position (or substantially in a single plane). Peripheral wall 5b has an end provided with protrusion 23 protruding (or raised) inwards.

Anode can 2 thus manufactured and the FIG. 9 cathode can 1, cathode 7, separator 9, lithium metal 8 and the like can be used to fabricate the FIG. 9 battery.

Third Embodiment

Figure 16:
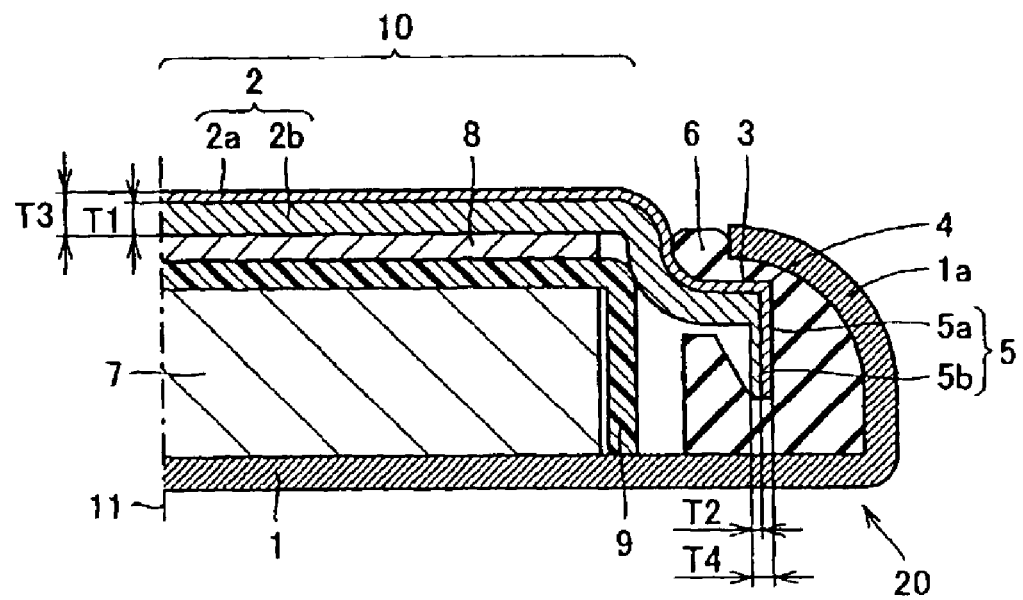
FIG. 16 is a schematic partial cross section of a third embodiment of the battery of the present invention.

The FIG. 16 battery 20 is a manganese (Mn)-lithium (Li) secondary battery, one of so-called organic electrolyte secondary batteries. It is basically similar in structure to the FIG. 1 battery, except for the geometry of an end of peripheral wall 5 of anode can 2. More specifically, for the FIG. 16 battery 20, anode can 2 has peripheral wall 5 with the hard aluminum alloy layer providing peripheral wall 5b free of a protrusion raised inwards (or increased in thickness), as shown in FIG. 1. In other words, in peripheral wall 5 the hard aluminum alloy layer provides peripheral wall 5b substantially uniform in thickness.

This can provide an effect similar to that of the FIG. 1 battery.

Reference will now be made to FIGS. 17–22 to describe a method of fabricating the anode can of the present invention shown in FIG. 16.

Initially in accordance with the first embodiment of the present invention the FIGS. 2–4 steps are followed. As a result, as described in the method of the first embodiment, clad member 21 has a periphery with hard aluminum alloy layer 2b reduced in thickness to provide a thin portion and hard aluminum alloy layer 2b and stainless steel layer 2a also have their respective side surfaces substantially in a single plane.

Figure 17:
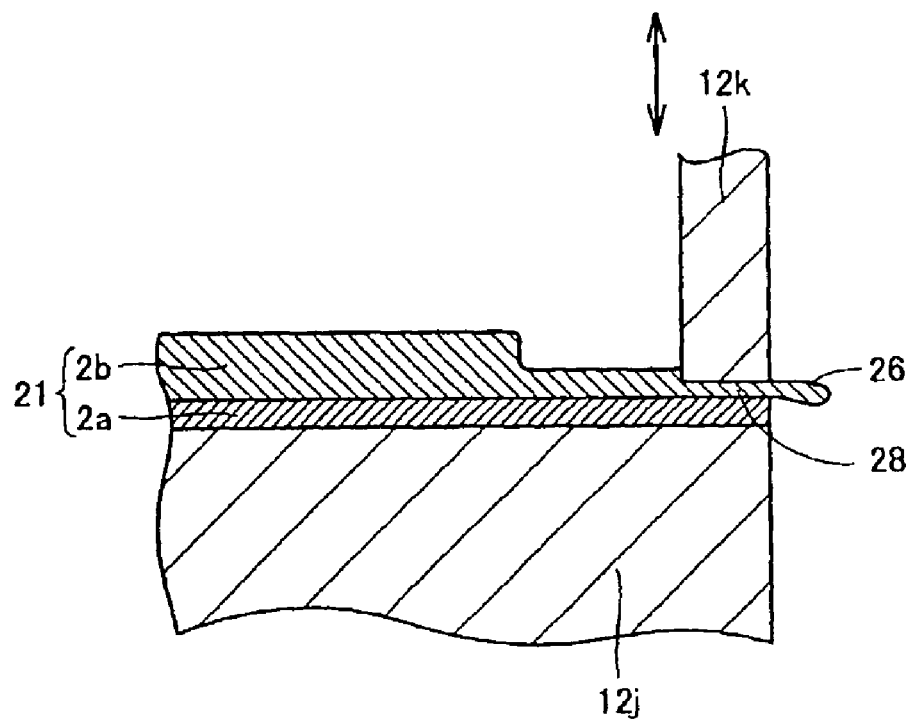
FIGS. 17–22 are schematic cross sections for illustrating first to sixth steps, respectively, of a method of manufacturing an anode can used in the FIG. 16 battery.

Then, as shown in FIG. 17, a punch 12k and a die 12j are used to press an end of clad material 21. The surface of punch 12k that abuts against an end of clad material 21 is substantially parallel to a surface of hard aluminum alloy layer 2b. Punch 12k is moved in a direction indicated by an arrow shown in the figure and it is thus pressed against an end of layer 2b of clad material 21. As a result, as shown in FIG. 17, layer 2b has an end reduced in thickness to provide a re-pressed portion 28 and simultaneously layer 2b is partially extruded 26.

It should be noted that re-pressed portion 28 is variable in size and thickness to match the geometry of clad material 21, the thicknesses of layers 2b and 2a, the levels in strength of materials respectively forming the layers, the degree of processing in subsequent process steps, and the like.

Figure 18:
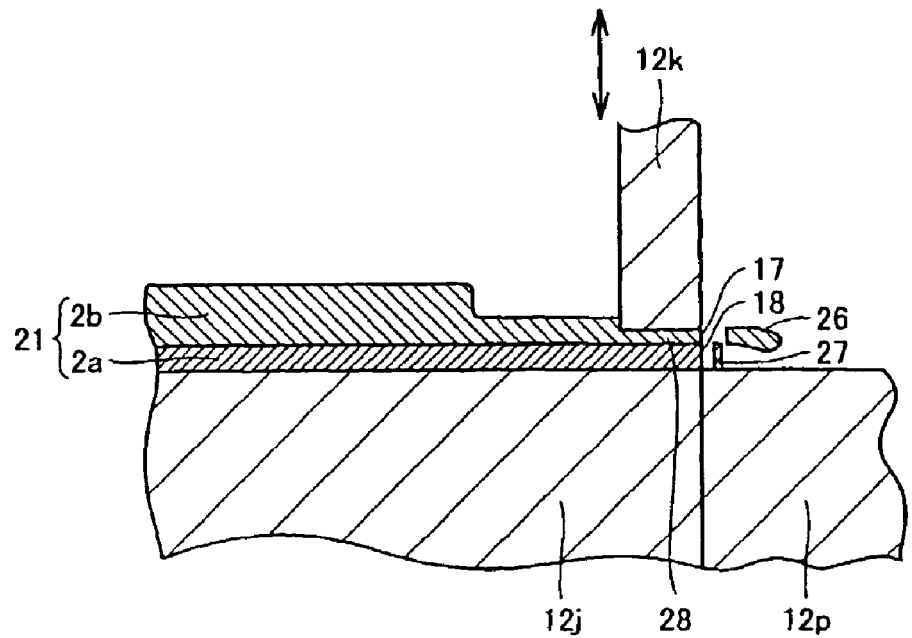

Then, as shown in FIG. 18, clad material 21 and punch 12k are moved relative to a die 12p in a direction indicated by an arrow to cut and separate extruded portion 26 of layer 2b and end 27 of layer 2a from clad, material 21. As a result, layers 2b and 2a have their respective side surfaces 17 and 18 substantially in a single plane.

Figure 19:
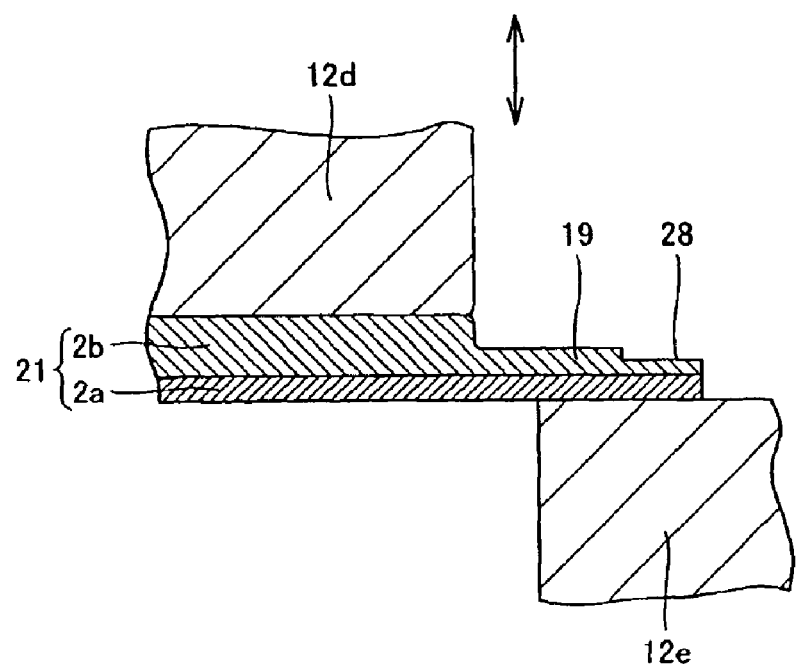
Figure 20:
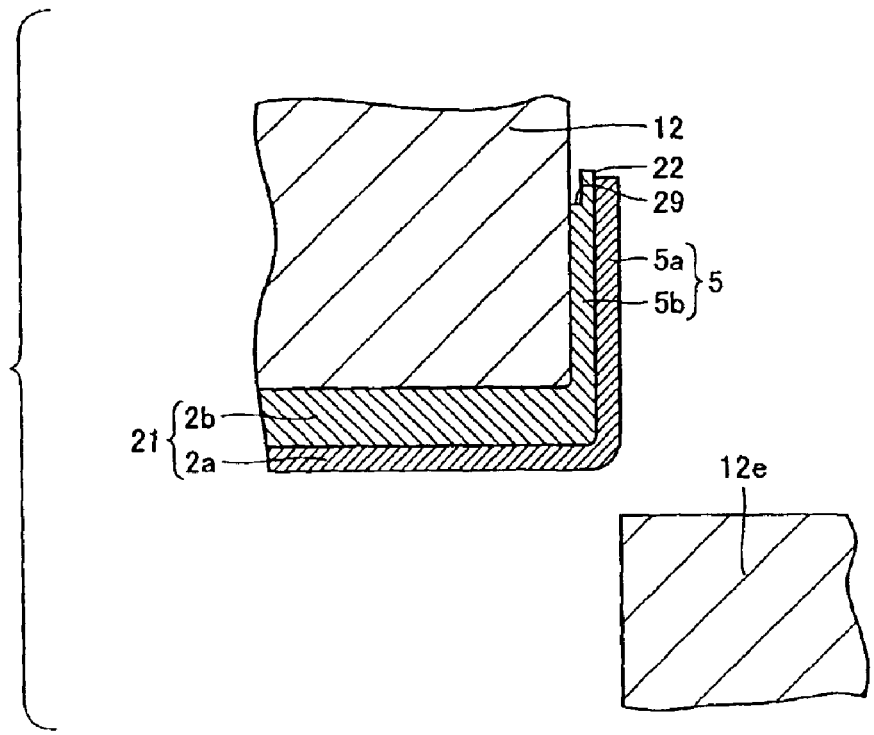

Then, as shown in FIGS. 19 and 20, a punch 12d and a die 12e are used to press clad material 21 to bend and thus erect a periphery thereof upward as seen in the figure. More specifically, as well as in the FIGS. 5 and 6 steps, clad material 21 and punch 12d are moved relative to die 12e in a direction indicated by an arrow shown in FIG. 19 to bend a periphery of clad material 21, as shown in FIG. 20. As a result, a thin portion located at a periphery of clad material 21 is bent and thus erected and peripheral wall 5 is thus formed.

Peripheral wall 5 includes the stainless steel layer's peripheral wall 5a and the hard aluminum arrow layer's peripheral wall 5b. Since peripheral wall 5b corresponds to the thin portion, a pressed portion, peripheral wall 5b is smaller in thickness than layer 2b located at terminal portion 10. Furthermore, hard aluminum alloy layer 2b has an end reduced in thickness to provide re-pressed portion 28. As such, if pressing thin portion 19, as shown in FIGS. 19 and 20, to bend and erect it results in layer 2b plastically flowing to some extent, layer 2b only has an end with a significantly small protrusion 22 slightly protruding relative to an end surface of peripheral wall 5a of the stainless steel layer. Furthermore, the end of peripheral wall 5b is provided with a step 29 at a boundary of repressed portion 28 and the remaining region.

Figure 21:
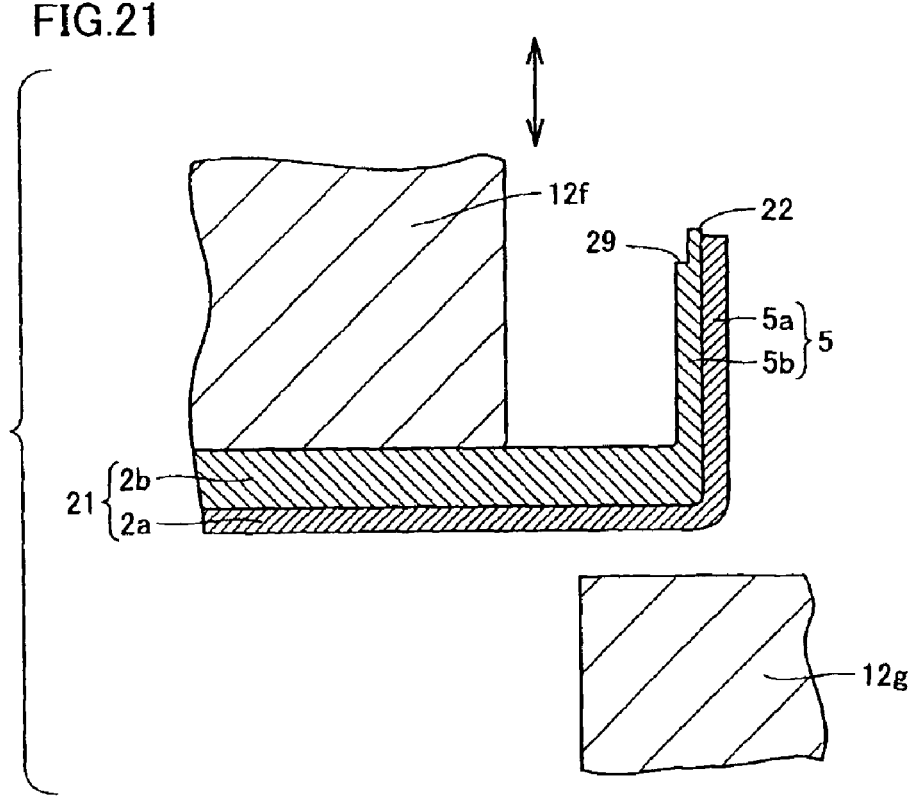
Figure 22:
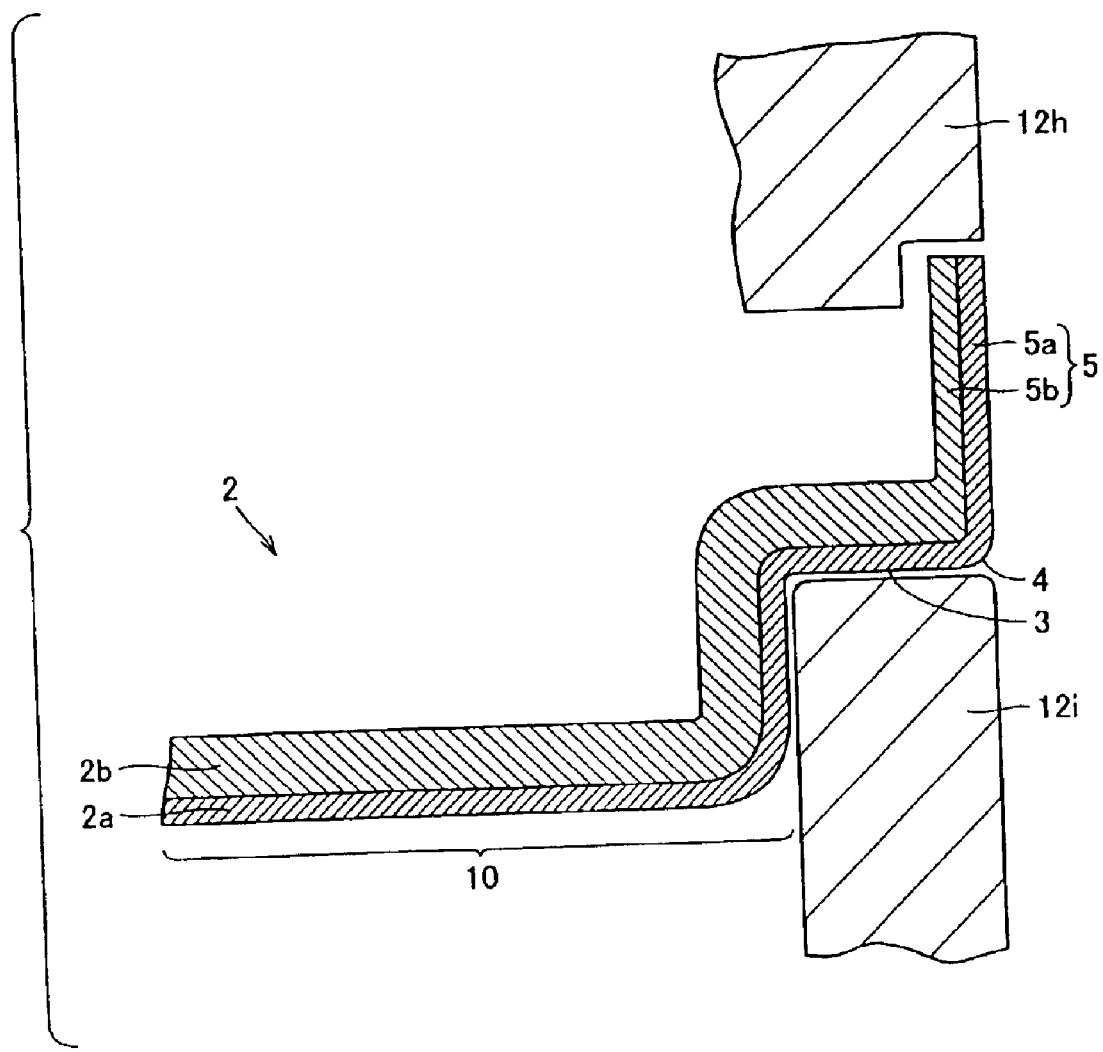

Then, as shown in FIG. 21, a punch 12f and a die 12g are used to press clad material 21 to form shoulder 3 and angled portion 4 surrounding terminal portion 10 (FIG. 22). More specifically, with reference to FIG. 21, clad material 21 and punch 12f are moved relative to die 12g in a direction indicated by an arrow shown in the figure to push a periphery of clad material 21 upward as seen in the figure. Shoulder 3 and angled portion 4 are thus formed.

At a periphery of clad material 21 bent and erected in the FIG. 21 step, hard aluminum alloy layer 2b has a smaller thickness. This can prevent a material forming layer 2b from plastically flowing from a center portion of clad material 21 into the periphery thereof in the FIG. 21 step. The periphery can thus be free of an end with hard aluminum alloy layer 5b having a side surface significantly protruding relative to a side surface of stainless steel layer 2a.

Then, as shown in FIG. 22, punches 12h and 12i are used to press clad material 21 to allow the hard aluminum alloy layer's peripheral wall 5b to have an end so that the hard aluminum alloy layer's peripheral wall 5b and the stainless steel layer's peripheral wall 5a have their respective end surfaces in a single plane. More specifically, punches 12h and 12i are moved in the same direction that peripheral wall 5 extends, so that the punches press an end surface of peripheral wall 5. Punches 12h and 12i each have a geometry determined to allow peripheral wall 5 to have an end surface with the aluminum alloy layer and the stainless steel layer providing their respective peripheral walls 5b and 5a having their respective end surfaces in alignment. As a result, as shown in FIG. 22, peripheral walls 5b and 5a can have their respective end surfaces substantially matched in position or substantially in a single plane.

Herein prior to the FIG. 22 step the FIGS. 17 and 18 steps previously provide an end of hard aluminum alloy layer 2b with re-pressed portion 28. As such, the hard aluminum alloy layer's peripheral wall 5b would not have an end surface significantly protruding relative to that of the stainless steel layer's peripheral wall 5a. Thus, despite the FIG. 22 step, peripheral wall 5b can be prevented from having an end disadvantageously covering that of peripheral wall 5a.

Anode can 2 thus fabricated and the FIG. 16 cathode can 1, cathode 7, separator 9, lithium metal 8 and the like can be used to fabricate a battery similar to the FIG. 16 battery.

Figure 23:
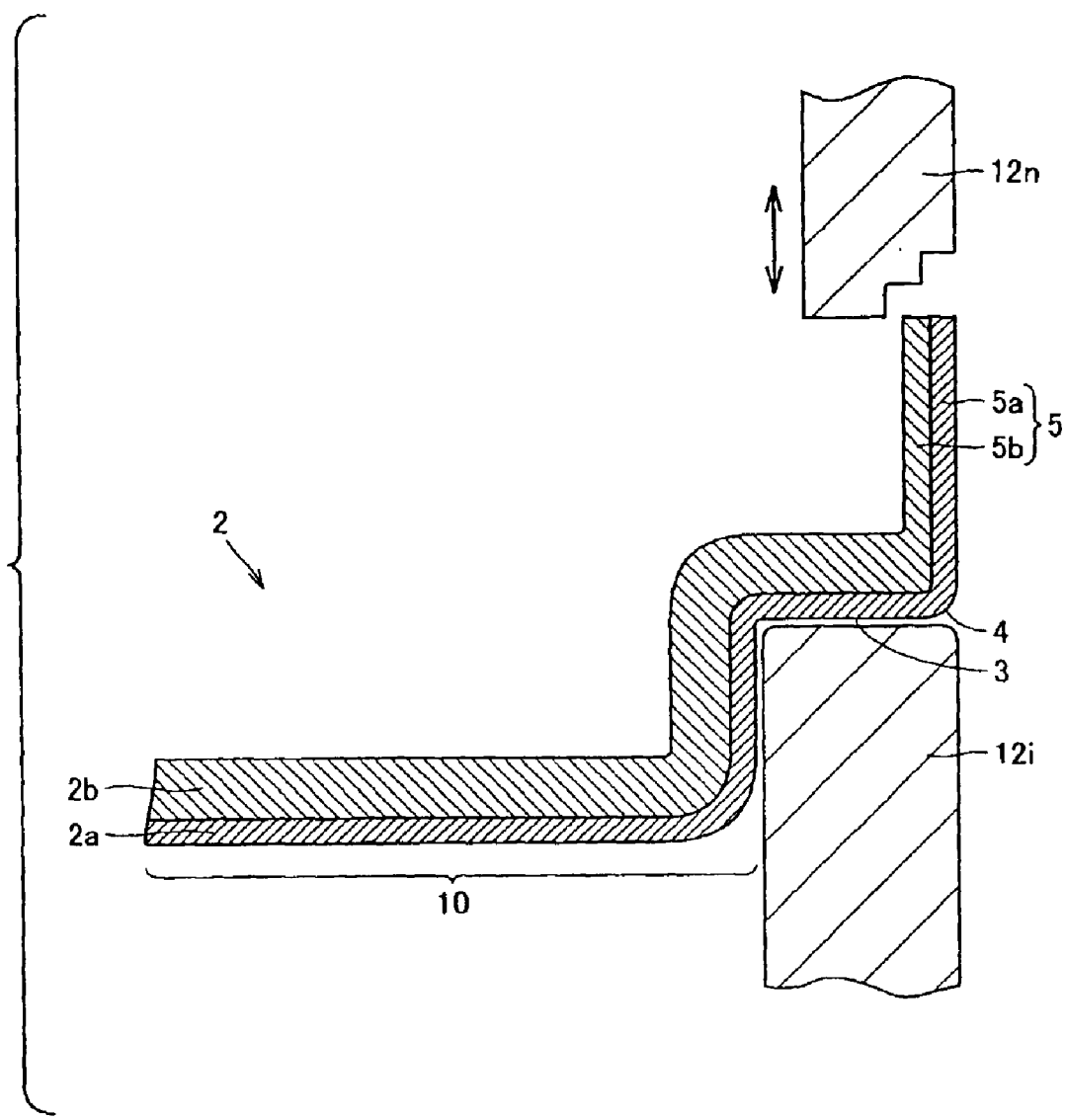
FIG. 23 is a schematic cross section for illustrating an exemplary variation of the third embodiment of the present invention providing the method of manufacturing the anode can.

Furthermore, the FIG. 22 step may be followed by such a step as shown in FIG. 23.

Figure 24:
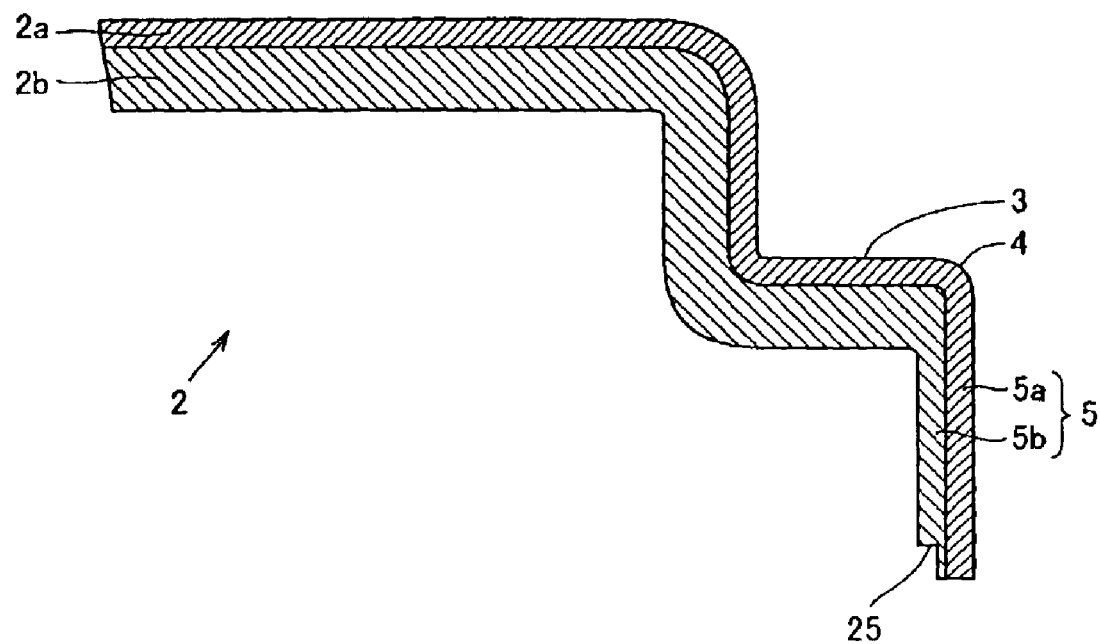
FIG. 24 is a schematic partial cross section of an anode can manufactured through the FIG. 23 step.
Figure 25:
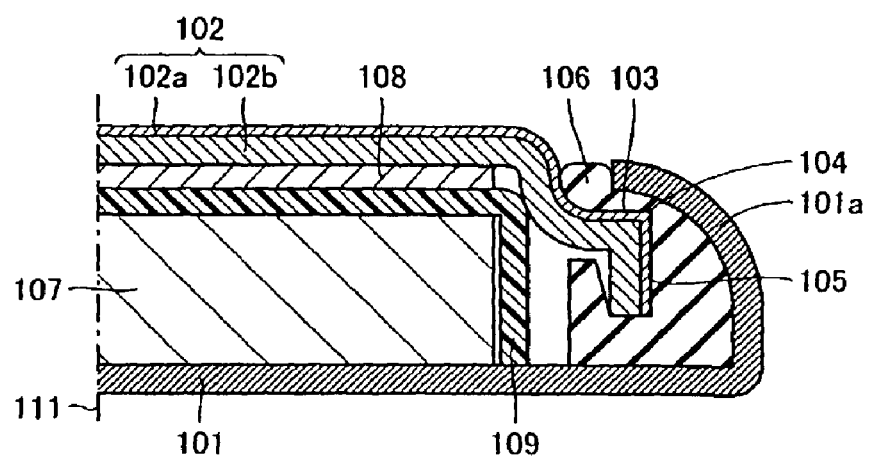
FIG. 25 is a schematic partial cross section of a conventional battery.
Figure 26:
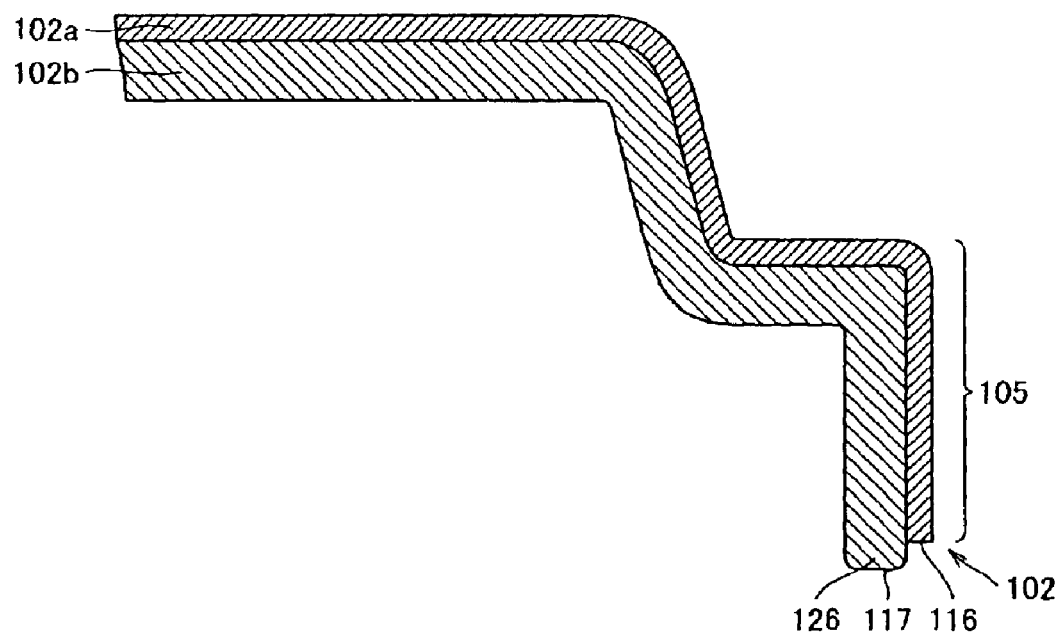
FIG. 26 is a schematic diagram for illustrating a disadvantage of the FIG. 25 battery.
Figure 27:
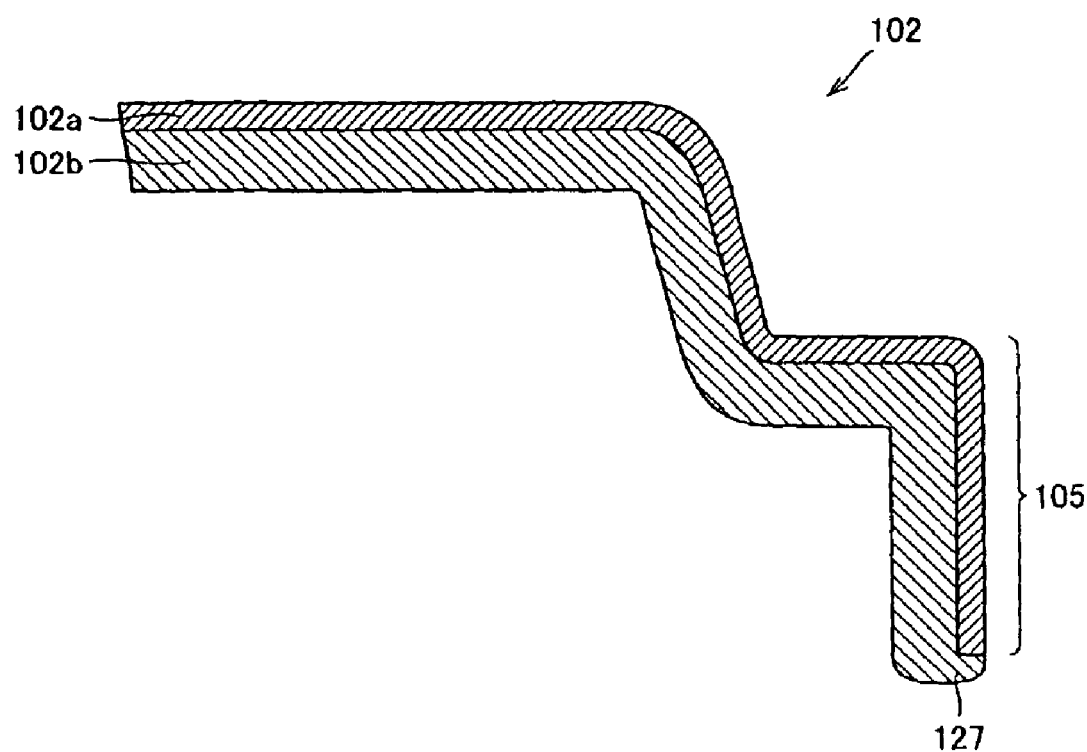
FIG. 27 is another schematic diagram for illustrating a disadvantage of the FIG. 25 battery.

The FIG. 23 step is basically similar to the FIG. 22 step, except that a punch 12n is different in geometry from the FIG. 22 punch 12h. Punch 12n used in the FIG. 23 step is provided with a step at a portion abutting against an end surface of peripheral wall 5. Such a punch 12n can be used to provide a step similar to the FIG. 22 step to obtain anode can 2 having a geometry as shown in FIG. 24. FIG. 24 is a schematic, partial cross section of an anode can fabricated through the FIG. 23 step.

With reference to FIG. 24, anode can 2 is basically similar in structure to that of battery 20 shown in FIG. 16, except for the geometry of an end of peripheral wall 5. More specifically, for the FIG. 24 anode can 2, peripheral wall 5 has an end with the hard aluminum alloy layer providing peripheral wall 5b having an end surface receding from that of peripheral wall 5a of the stainless steel layer (or peripheral wall 5a has an end surface protruding relative to that of peripheral wall 5b). If anode can 2 having such a step 25 is applied to a battery, anode can 2 and gasket 6 (see FIG. 16) can be bonded together more closely and thus provide enhanced hermeticity. Note that the receding end surface of peripheral wall 5b is positionally variable, as appropriate, to match the specification of anode can 2.

Note that the FIG. 22 step may be replaced with the FIG. 23 step.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an anode can of a secondary battery, comprising the steps of:

(a) preparing a material formed of a stack of layers including an aluminum alloy layer and a stainless steel layer formed on said aluminum alloy layer, said material being cut to match in size an anode can to be obtained;

(b) reducing said aluminum alloy layer in thickness at a periphery of said material;

(c) after step (b), cutting an edge of said periphery of said material to allow said aluminum alloy layer and said stainless steel layer to have their respective side surfaces substantially in a single plane; and (d) after step (c), bending and thus erecting said periphery of said material in a direction.

2. The method of claim 1, further comprising before step (d) and after step (c) the step of re-processing said aluminum alloy layer at said periphery of said material to prevent said aluminum alloy layer from having an end extending over said side surface of said stainless steel layer in step (d).

3. The method of claim 1, further comprising after step (d) the step of causing said aluminum alloy layer to recede from said stainless steel layer at an end surface of said periphery of said material.

4. A method of fabricating a secondary battery using the method as recited in claim 1.

* * * * *